United States Patent [19]

Presley

[11] 4,169,515
[45] Oct. 2, 1979

[54] POWER STEERING DEVICE

[75] Inventor: Rex W. Presley, Livonia, Mich.

[73] Assignee: The Bendix Corporation, Southfield, Mich.

[21] Appl. No.: 880,402

[22] Filed: Feb. 23, 1978

[51] Int. Cl.² .............................................. B62D 5/08
[52] U.S. Cl. ...................................... 180/149; 60/388; 91/375 A; 418/186
[58] Field of Search ...................... 180/146, 147, 149; 418/186; 91/375 A; 60/388, 386

[56] References Cited

U.S. PATENT DOCUMENTS

| | | | |
|---|---|---|---|
| 2,030,902 | 2/1936 | Vickers | 180/133 |
| 2,788,671 | 4/1957 | Talbot | 180/146 X |
| 3,131,602 | 5/1964 | Ford | 91/375 X |
| 3,602,255 | 8/1971 | Bishop | 137/625.24 |
| 3,944,015 | 3/1976 | Bishop | 180/148 |

Primary Examiner—Joseph F. Peters, Jr.
Assistant Examiner—R. Schrecengost
Attorney, Agent, or Firm—Paul David Schoenle; Ken C. Decker

[57] ABSTRACT

A power steering device includes a housing which couples to a pressure source in order to provide a power assist to the rotation of an output member upon rotation of an input member. The input member and the output member are rotatably supported within a housing bore such that the output member cooperates with an enlarged portion of the housing bore to define a plurality of pressure chambers. Slots on the input member and passages on the output member communicate the pressure source to one set of pressure chambers so that the increased pressure in these pressure chambers imparts rotation to the output member in response to rotation of the input member. A pair of cavities between the input and output members communicate the input member slots with the output member passages and projections on the output member oppose the slot side walls to limit rotation between the input member and output member. The output member supports a plurality of vanes within the enlarged diameter portion of the housing bore and is eccentrically mounted within the enlarged portion so that pressure communicated to chambers defined by the vanes imparts rotation to the vanes and output member. A pressure feedback chamber is provided between the input member and the housing.

9 Claims, 3 Drawing Figures

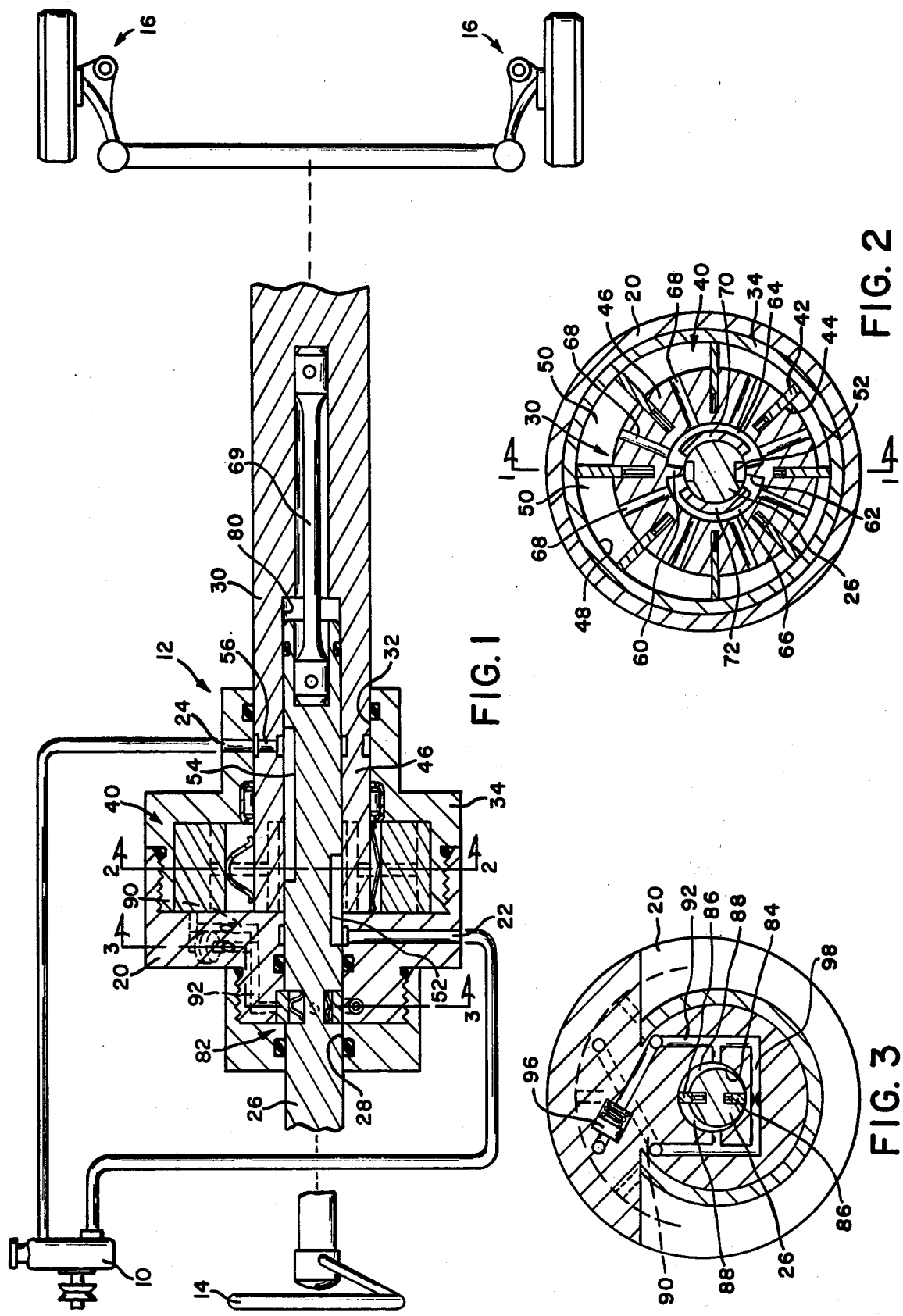

POWER STEERING DEVICE

BACKGROUND OF THE INVENTION

A power steering system generally utilizes pressurized fluid from a power steering pump to provide an assist in turning a pair of dirigible wheels. In such a system a rotary valve cooperates with an input shaft to communicate the pressurized fluid from the power steering pump to a power cylinder. Depending on the direction of turning, pressurized fluid is communicated to one side of a piston within the power cylinder. With the piston coupled to an output shaft, or steering linkage, movement of the piston by the pressurized fluid imparts movement to the output shaft to provide a power assist upon movement of the input shaft.

As illustrated in U.S. Pat. Nos. 3,602,225 and 3,944,015, the power cylinder and piston take up substantial space and require complex coupling to the output shaft or to the steering linkage. Consequently, a simple rotary actuator, in conjunction with a power steering valve, which is also integrally formed with an output member is believed to be an improvement over the state of the art.

SUMMARY OF THE INVENTION

The present invention relates to a power steering device wherein a housing rotatably supports an input member and an output member. The input member couples to a steering wheel for rotation by a vehicle operator and the output member couples to a steering linkage for imparting direction to a pair of dirigible wheels.

In accordance with the invention the output member carries a plurality of vanes which slidably engage a cylindrically enlarged portion of the housing to form a plurality of pressure chambers which define a rotary actuator. Slots in the input member and passages in the output member communicate a pressure source with the pressure chambers and the input member is rotatable relative to the output member to control the communication of pressurized fluid from the power source to individual pressure chambers. With the output member being eccentrically mounted in the enlarged portion of the housing, pressurized fluid within one of the chambers formed by two vanes causes the vanes and output member to rotate because one of the two vanes exposes a greater length to the pressure chamber than the other of the two vanes. Projection on the output member oppose each slot such that rotation between the input member and the output member is limited. A pair of arcuate cavities are formed between the input member and the output member to communicate the input member slots with the output member passages and the input member is rotatable relative to the output member such that the flanges cooperate with the input member to communicate pressurized fluid from the pressure source to one of the arcuate cavities, thereby pressurizing those pressure chambers communicating with the one arcuate cavity. At the same time the other arcuate cavity is communicated to a return port to vent those pressure chambers communicating with the other cavity. The resulting unbalance in the pressurization of the pressure chambers causes the output member to rotate in the direction of the input member.

Another feature of the present invention provides a pressure feedback to the input member in response to the pressurization of the pressure chambers formed by the output member. To accomplish feedback, the input member cooperates with the housing to form a second rotary actuator communicating with the output member rotary actuator.

It is an object of the present invention to provide an output member in a power steering valve with an integral power motor in the form of a rotary actuator so that the power assist of the power steering valve is imparted directly to the output member.

BRIEF DESCRIPTION OF THE DRAWINGS

FIG. 1 is a schematic view of a power steering system with a longitudinal cross-sectional view of a power steering valve constructed in accordance with the present invention;

FIG. 2 is a cross-sectional view taken along line 2—2 of FIG. 1; and

FIG. 3 is a cross-sectional view taken along line 3—3.

DETAILED DESCRIPTION

In the schematic illustration of FIG. 1, a power steering pump in a motor vehicle supplies pressurized fluid to a power steering valve 12 such that rotation of a steering wheel 14 by a vehicle operator imparts a power assist to the turning of a pair of dirigible wheels at 16.

The power steering valve 12 comprises a housing 20 having an inlet 22 and an outlet 24 which communicate with the pressure source 10. An input member 26 is rotatably supported within a first bore 28 and an output member 30 is rotatably supported within a second bore 32. The first bore 28 is smaller in diameter than the second bore 32 and the bores are separated by an enlarged diameter portion 34. The input member 26 is coupled to the steering wheel 14 for rotation therewith and the output member 30 is coupled to the pair of dirigible wheels 16 by any suitable means, such as a rack and pinion or a steering linkage.

In accordance with the invention, the output member 30 forms an integral rotary actuator 40 which is disposed within the enlarged diameter portion 34 of the housing 20. Turning to FIG. 2, it is seen that the rotary actuator 40 comprises a plurality of vanes at 42 which are slidably supported within recesses 44 on the output member. The recesses are cut in a flange 46 formed at one end of the output member 30. The plurality of vanes 42 are biased radially outwardly to slidably engage the inner wall 48 of the enlarged diameter portion 34 to form pressure chambers at 50. As the enlarged diameter portion 34 is eccentrically oriented relative to the rotating axis of the output member 30, adjacent vanes forming a pressure chamber expose different radial lengths to the pressure chamber.

In order to communicate the pressure chambers with the pressure source, the input member 26 forms a slot 52 communicating with the inlet 22 and a slot 54 communicating via output member passage 56 with the outlet 24. A pair of projections at 60 and 62 on the output member 30 cooperate with the input member 26 to form a pair of arcuate cavities at 64 and 66 and radial passages at 68 communicate respective pressure chambers 50 with either cavity 64 or cavity 66.

The input member 26 is rotatable relative to the output member 30 to a limited degree as the torsion bar 69 is pinned to the input member 26 and the output member 30 to resist relative rotation. Moreover, a pair of sleeves at 70 and 72 are fixedly attached to the input member 26 to oppose the projections 60 and 62, thereby limiting the relative rotation between the input member and the output member, as the sleeves are engageable with the projections when the input member 26 is rotated relative to the output member 30.

The output member 30 forms a blind stepped bore 80 for rotatably receiving the input member 26 and the torsion bar 69. The axial width of the flange 46 on the output member 30 is substantially equal to the axial width of the enlarged diameter portion 34 so that the flange opposes the inner side walls of the enlarged diameter portion to axially fix the position of the output member within the housing.

An additional feature of the present invention provides for a second rotary actuator 82 between the input member 26 and the housing 20 at the first bore 28. Turning to FIG. 3 it is seen that the first bore 28 includes an enlarged diameter portion 84 which is eccentric to the first bore 28 and the input member 26 supports a plurality of vanes at 86 which are biased radially outwardly to slidably engage the inner wall of the enlarged diameter portion 84, thereby forming a plurality of feedback pressure chambers 88. Viewing FIGS. 2 and 3, the left passage 90 communicates the left feedback pressure chamber 88 with either of the right pressure chambers 50 and the right passage 92 communicates the right feedback pressure chamber 88 with either of the left pressure chambers 50.

MODE OF OPERATION

In the neutral position illustrated in FIGS. 2 and 3 pressurized fluid form the pressure source 10 is communicated to the inlet 22 which communicates the pressurized fluid to the slot 52. From the slot 52 the pressurized fluid flows past the projection 62 to pressurize both arcuate cavities 64 and 66. Pressurized fluid within the arcuate cavities flows to the pressure chambers 50 via output radial passages 68 in order to pressurize the rotary actuator 34. The slot 54 communicates pressurized fluid from both arcuate cavities to the outlet 24 via passage 56. With both arcuate cavities pressurized to substantially the same pressure the resulting forces on each vane 42 will offset each other so that no rotational force will be imparted to the output member 30. In addition, pressurized fluid communicated from one of the right pressure chambers to the left feedback pressure chamber via passage 90 and from one of the left pressure chambers to the right feedback pressure chamber via passage 92 offset each other so that the input member 26 remains stationary in the neutral position.

A clockwise rotation of the input member 26, viewing FIG. 2, opens the slot 52 to the left arcuate cavity while at the same time opening slot 54 to the right arcuate cavity. Consequently, the communication between the right cavity 64 and right pressure chambers and the outlet is increased to reduce the pressure therein and the communication between the left cavity 66 and left pressure chambers and the inlet is increased to increase the pressure therein. The increased pressure in the left pressure chambers more than offsets the reduced pressure in the right pressure chambers to form a resulting moment causing the vanes 42 and the output member 30 to rotate in the direction of the input member 26. This resulting moment provides a power assist to the transmission of rotation from the input member to the output member.

To provide a optional feedback response to the input member, thereby dampening any oscillations of the input member, the passage 92 communicates the increased pressure from the left pressure chambers to the right feedback pressure chamber 88 and the passage 90 communicates the reduced pressure from the right pressure chambers to the left feedback pressure chamber 88. Consequently, the increased pressure in the right feedback chamber more than offsets the reduced pressure in the left feedback chamber to form a resulting moment opposing the clockwise rotation of the input member. This opposing moment resists the rotation of the input member to provide for stable operation during turning of the steering wheel.

Viewing FIG. 3, it is seen that the greatest feedback response is provided at the neutral position with feedback response decreasing to zero as the input member approaches a 90° rotation away from the neutral position. Stability in the operation of the power steering valve is critical during high speed driving when the input member is generally at the neutral position. Therefore, the decrease in feedback response at the 90° rotated position does not severely affect the control of the vehicle because large steering wheel rotations generally occur at low speeds when parking or turning sharp corners.

Although the power steering valve of the present invention is illustrated with eight pressure chambers and two feedback chambers, it is possible to use any number of pressure chambers and feedback chambers so long as the number is equal to or greater than two. Moreover, the passages 90 and 92 are illustrated in communication with a right pressure chamber and a left pressure chamber, respectively; however, the passages 90 and 92 could communicate with the right arcuate cavity and the left arcuate cavity, respectively, as the pressure therein corresponds to the pressure within the pressure chambers.

In a modified embodiment (not shown) of the present invention, the rotary actuators at 40 and 82 comprise gears which form pressure chambers for imparting rotation to the output member and imparting feedback to the input member, respectively.

Viewing FIG. 3, it is seen that a feedback piston 96 is disposed within passage 92 so that fluid will not flow from the right pressure chamber to the left pressure. Also a restricted bypass passage is shown at 98 to equalize the pressure in the feedback chambers at steady state. If the leakage between the feedback chambers, via the sliding engagement between the vanes 86 and the portion 84, is sufficient, the restricted bypass passage 98 can be omitted.

Many other modifications of the present invention are possible and it is intended that these modifications fall within the scope of the appended claims.

I claim:

1. In a power steering vehicle device having an input member coupled to a steering wheel, an output member coupled to a steering linkage and a housing for rotationally supporting the input member and the output member and communicating with a pressure source, the improvement wherein said output member includes means which cooperate with said housing to form a plurality of pressure chambers, said input member and said output member cooperating to communicate the pressure source with the plurality of pressure chambers via an arcuate cavity formed between said input member and said output member, said input member being rotatable relative to said output member to control communication to the plurality of pressure chambers, and said member including radial passages extending from said arcuate cavity to said plurality of pressure chambers for opening communication therebetween.

2. A power steering valve for use with a pressure source comprising:
- a housing having a bore extending therethrough which includes an enlarged diameter portion;
- an input member rotatably disposed within the bore; and
- an output member resiliently coupled to said input member to provide for limited rotation therebetween, said output member cooperating with the enlarged diameter portion of the housing bore to form at least two pressure chambers, said input and output members having passages which communicate the pressure source with the two pressure chambers, said input member being rotatable relative to said output member to increase communication to one of said pressure chambers and decrease communication to the other pressure chambers, said input member including at least one slot communicating with the pressure source and said output member including a flange cooperating with said slot to control communication to the pressure chambers and said flange also cooperating with said input member to limit the rotation between said input and output members.

3. A power steering device comprising:
- a housing having an inlet and an outlet in communication with a pressure source;
- an input member rotatably supported by said housing; and
- an output member rotatably supported by said housing and cooperating with said input member to provide for limited rotation therebetween;
- said output member cooperating with said housing to form a first rotary actuator and cooperating with said input member to communicate the first rotary actuator with the pressure source to provide a power assist to the rotation of said output member;
- said input member cooperating with said housing to form a second rotary actuator, said second rotary actuator communicating with said first rotary actuator to impart resistance to rotation of said input member in response to the power assist of said first rotary actuator.

4. The power steering device of claim 3 in which said first and second rotary actuators include radial dimensions, said second rotary actuator radial dimension being less than that of said first rotary actuator.

5. The power steering device of claim 3 in which said first and said second rotary actuators each comprise a plurality of vanes which are carried by said input member and said output member, respectively.

6. The power steering device of claim 3 in which said housing forms an axial bore for rotatably supporting said input member and said output member, said output member including a bore for receiving a portion of said input member and said first rotary actuator being radially spaced from said input member portion, said second rotary actuator being axially spaced from said output member.

7. The power steering device of claim 3 in which the resistance to the rotation of said input member varies in relation to the rotated position of said input member.

8. A power steering valve for use with a pressure source comprising:
- a housing having a bore extending therethrough which includes an enlarged diameter portion;
- an input member rotatably disposed within the bore; and an output member resiliently coupled to said input member to provide for limited rotation therebetween, said output member cooperating with the enlarged diameter portion of the housing bore to form at least two pressure chambers, said input and output members having passages which communicate the pressure source with the two pressure chambers, said input member being rotatable relative to said output member to increase communication to one of said pressure chambers and decrease communication to the other pressure chambers, said input member including slots with side walls and said output member including flanges which cooperate with the slots to control communication with the pressure chambers, and said flanges oppose the side walls of said slots to limit the rotation between the input and output members.

9. A power steering valve comprising:
- a housing communicating with a pressure source; and
- an input member rotatable within said housing;
- an output member resiliently coupled to input member to proprive for limited rotation therebetween, said output member cooperating with said housing to form a plurality of pressure chambers, said input member and said output member defining a pair of cavities, said output member including passages communicating said pair of cavities with corresponding pressure chambers, said input member having slots communicating with the pressure source, said input member being rotated relative to said output member to increase the communication from the pressure source to those pressure chambers communicating with one of said pair of cavities and decrease communication from the pressure source to those pressure chambers communicating with the other of said pair of cavities, and said output member including flanges opposite said input slots and said slots including side walls which oppose said flanges to limit the rotation between said input and output members.

* * * * *